US012430967B2

(12) United States Patent
Rydkin et al.

(10) Patent No.: US 12,430,967 B2
(45) Date of Patent: Sep. 30, 2025

(54) ACCESS CONTROL APPARATUS LOCATOR

(71) Applicant: Carrier Corporation, Palm Beach Gardens, FL (US)

(72) Inventors: Maxim Rydkin, Penfield, NY (US); Michael Yudichak, Fairport, NY (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/247,626

(22) Filed: Dec. 18, 2020

(65) Prior Publication Data

US 2021/0209880 A1 Jul. 8, 2021

Related U.S. Application Data

(60) Provisional application No. 62/956,453, filed on Jan. 2, 2020.

(51) Int. Cl.
*G07C 9/00* (2020.01)
*G08B 7/06* (2006.01)

(52) U.S. Cl.
CPC ........... *G07C 9/00571* (2013.01); *G08B 7/06* (2013.01)

(58) Field of Classification Search
CPC .............................. G07C 9/00571; G08B 7/06
See application file for complete search history.

(56) References Cited

U.S. PATENT DOCUMENTS 4,476,469 A 10/1984 Lander
5,714,932 A 2/1998 Castellon et al.
5,823,027 A 10/1998 Glick et al.
6,201,470 B1 3/2001 Withington
7,453,357 B2 11/2008 Bernal-Silva et al.
9,311,586 B2 4/2016 Robinette et al.
10,440,501 B2 10/2019 Howard et al.
(Continued)

FOREIGN PATENT DOCUMENTS

CN 106161423 A 11/2016

OTHER PUBLICATIONS

Hamblen, Jim, "Using RGB LEDs", Sep. 5, 2018, "https://web.archive.org/web/20190108001454/https://os.mbed.com/users/4180_1/notebook/rgb-leds/" (Year: 2018).*
(Continued)

*Primary Examiner* — Stephanie R Burgdorf
(74) *Attorney, Agent, or Firm* — Seager, Tufte & Wickhem, LLP

(57) ABSTRACT

A method for locating at least one access control apparatus within an access control system is provided. The method includes transmitting, through a wired connection, the wired connection being between a controller and at least one access control apparatus, a signal comprising at least one access control apparatus instruction to at least one of a first access control apparatus and a second access control apparatus, and performing at least one response (ex. emitting a sound and/or light) by at least one of the first access control apparatus and the second access control apparatus. The signal, in certain instances, may be sent from the controller (ex. initiated by software installed on the controller), or from a handheld device (ex. patching into the wired connection). By performing this response, a user is more easily able to locate at least one of the first access control apparatus and the second access control apparatus.

10 Claims, 2 Drawing Sheets

(56) References Cited

U.S. PATENT DOCUMENTS

| | | | | |
|---|---|---|---|---|
| 2008/0084299 | A1* | 4/2008 | Fisher ..................... | E05B 47/02 340/542 |
| 2014/0132963 | A1 | 5/2014 | Diaz | |
| 2016/0180618 | A1 | 6/2016 | Ho et al. | |
| 2018/0053363 | A1 | 2/2018 | Ravida | |
| 2018/0068541 | A1* | 3/2018 | Almomani ............. | G08B 17/10 |
| 2019/0147676 | A1 | 5/2019 | Madzhunkov et al. | |
| 2019/0318561 | A1 | 10/2019 | Padilla et al. | |

OTHER PUBLICATIONS

EP Application No. 20215207.0, Extended Search Report, dated May 21, 2021, 7 pages.

* cited by examiner

ACCESS CONTROL APPARATUS LOCATOR

CROSS REFERENCE TO A RELATED APPLICATION

The application claims the benefit of U.S. Provisional Application No. 62/956,453 filed Jan. 2, 2020, the contents of which are hereby incorporated in their entirety.

BACKGROUND

Access control apparatuses are used to regulate both the entry into and movement within a controlled space. Access control systems incorporate a plurality of access control apparatuses. To control each access control apparatus, access control systems use controllers.

Many businesses use access control systems to safeguard and secure their premises. In any given commercial building there may be hundreds of access control apparatuses and numerous controllers. Each controller having a maximum number of access control apparatuses that the controller can support. These access control systems are installed by skilled electronic security access control technicians to meet the needs of the business occupying the building. To maintain or modify the access control system, the technicians need to be able to identify and locate the access control apparatuses within the controlled space. This can become troublesome if the technician doing the maintenance or modification is not the technician who installed the system, or if the installation was not well documented. Currently technicians locate the access control apparatuses by walking around the building swiping cards, physically tracing wires, or using telecom tone generators, but this can be a very time consuming process.

Accordingly, there remains a need for a method that reduces the amount of time it takes to locate access control apparatuses within an access control system.

BRIEF DESCRIPTION

According to one embodiment, a method for locating at least one access control apparatus is provided, which includes, transmitting, through a wired connection, the wired connection being between a controller and at least one access control apparatus, a signal including at least one access control apparatus instruction to at least one of a first access control apparatus and a second access control apparatus, and performing at least one response by at least one of the first access control apparatus and the second access control apparatus, the response including at least one of: emitting a sound and emitting a light.

In accordance with additional or alternative embodiments, the response enables a user to locate at least one of the first access control apparatus and the second access control apparatus within a controlled space.

In accordance with additional or alternative embodiments, the first access control apparatus is an access control reader or a door controller.

In accordance with additional or alternative embodiments, the second access control apparatus is an access control reader or a door controller.

In accordance with additional or alternative embodiments, the signal is transmitted from the controller through the wired connection.

In accordance with additional or alternative embodiments, the controller receives an instruction from an access control software application to transmit the signal.

In accordance with additional or alternative embodiments, the access control software application is accessible through a cloud-based platform.

In accordance with additional or alternative embodiments, the access control software application is accessible through a local computer system.

In accordance with additional or alternative embodiments, the signal is transmitted from a handheld device through the wired connection, the handheld device configured to patch into the wired connection.

In accordance with additional or alternative embodiments, the light includes at least one of: a blinking and a color.

In accordance with additional or alternative embodiments, the sound includes at least one of: a buzz and a beep.

In accordance with additional or alternative embodiments, the signal is transmitted to only one of the first access control apparatus or the second access control apparatus.

In accordance with additional or alternative embodiments, the response is performed by only one of the first access control apparatus or the second access control apparatus.

According to another aspect of the disclosure, an access control system is provided. The access control system including a first access control apparatus configured to receive a signal including at least one access control apparatus instruction through a first wired connection, a second access control apparatus configured to receive a signal including at least one access control apparatus instruction through a second wired connection, and a controller in wired communication with the first access control apparatus through the first wired connection and the second access control apparatus through the second wired connection, wherein the at least one access control apparatus instruction causes at least one of the first access control apparatus and the second access control apparatus to perform a response, the response including at least one of: emitting a sound and emitting a light.

In accordance with additional or alternative embodiments, the response enables a user to locate at least one of the first access control apparatus and the second access control apparatus within a controlled space.

In accordance with additional or alternative embodiments, the controller is configured to transmit the signal to at least one of the first access control apparatus and the second access control apparatus.

In accordance with additional or alternative embodiments, the controller receives an instruction from an access control software application to transmit the signal.

In accordance with additional or alternative embodiments, the access control software application is accessible through a cloud-based platform.

In accordance with additional or alternative embodiments, the access control software application is accessible through a local computer system.

In accordance with additional or alternative embodiments, the access control system further includes a handheld device capable of patching into at least one of the first wired connection and the second wired connection, the handheld device configured to transmit the signal to at least one of the first access control apparatus and the second access control apparatus.

In accordance with additional or alternative embodiments, the signal is transmitted to only one of the first access control apparatus or the second access control apparatus.

In accordance with additional or alternative embodiments, only one of the first access control apparatus or the second access control apparatus performs the response.

In accordance with additional or alternative embodiments, the light includes at least one of: a blinking and a color.

In accordance with additional or alternative embodiments, the sound includes at least one of: a buzz and a beep.

In accordance with additional or alternative embodiments, the first access control apparatus is an access control reader or a door controller.

In accordance with additional or alternative embodiments, the second access control apparatus is an access control reader or a door controller.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

DETAILED DESCRIPTION

Access control apparatuses can include anything from a door controller to an access control reader. Each access control apparatus processes access requests from requesting devices (ex. access cards and/or phones). To connect each access control apparatus to the access control system, each access control apparatus may be connected to a controller. The controllers make the authorization decisions for a given access point (ex. a door or an elevator) based on the credentials presented by the requesting device.

These access control apparatuses and controllers are located throughout a controlled space. For example, each door within a controlled space (ex. a commercial building) may have its own access control apparatus. The controllers, may, depending on the particular controller, have the capability of connecting more than one access control apparatus. A controller may be located several feet (ex. up to 4000 feet) away from an access control apparatus of which it is connected to. As such, locating the access control apparatuses connected to a particular controller within a controlled space can be very time consuming for technicians. To ease the locating of the access control apparatuses, a method for locating at least one access control apparatus, and an access control system enabling the location of an access control apparatus within a controlled space are provided.

Figure 1:
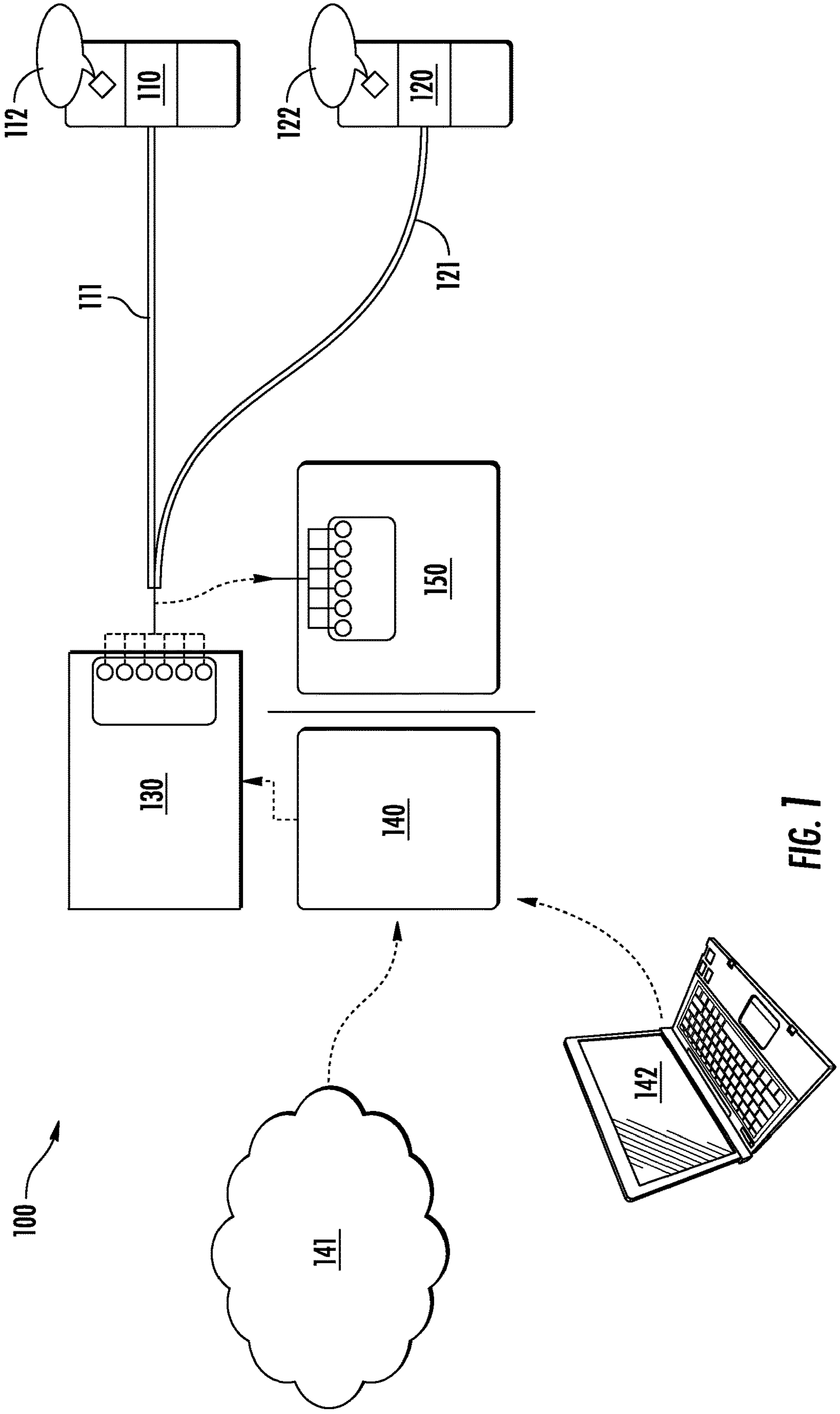
FIG. 1 is a perspective view of an access control system in accordance with one aspect of the disclosure.

With reference now to the Figures, a perspective view of an access control system 100 is shown in FIG. 1, which incorporates a first access control apparatus 110 configured to receive a signal including at least one access control apparatus instruction through a first wired connection 111, a second access control apparatus 120 configured to receive a signal including at least one access control apparatus instruction through a second wired connection 121, a controller 130 in wired communication with the first access control apparatus 110 through the first wired connection 111 and the second access control apparatus 120 through the second wired connection 121. In certain instances the signal, which includes at least one access control apparatus instruction, is a particular voltage sent through at least one of the first wired connection 111 and the second wired connection 121.

Figure 2:
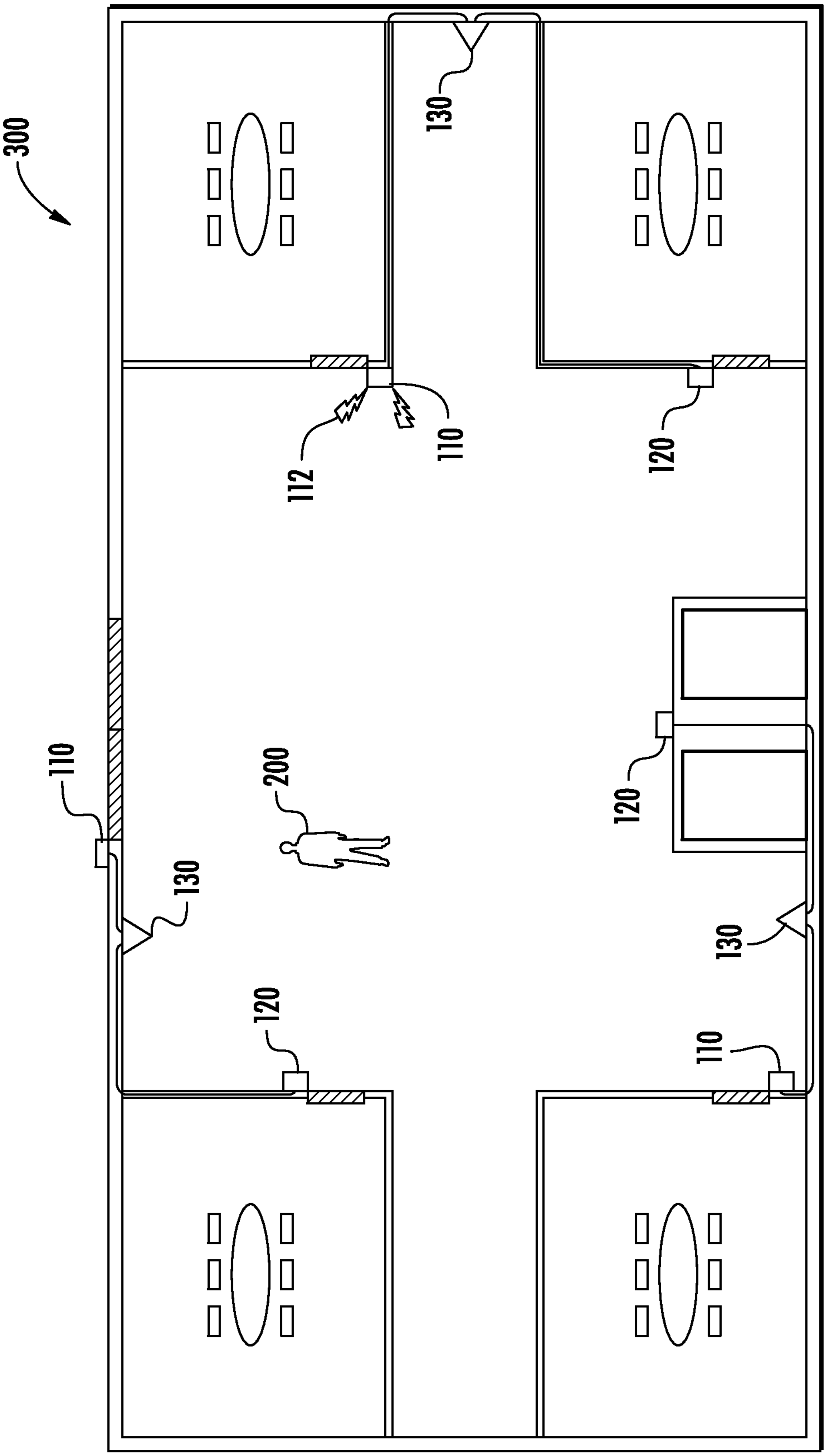
FIG. 2 is a schematic illustration of an access control system installed within a controlled space in accordance with one aspect of the disclosure.

The at least one access control apparatus instruction causes at least one of the first access control apparatus 110 and the second access control apparatus to perform a response 112, 122. The response 112, 122 including at least one of emitting a sound and emitting a light. In certain instances, different voltages trigger different responses 112, 122 (ex. different colored lights, different frequency of blinking, different frequency of buzzing, and/or different frequency of beeping). The response 112, 122 performed by the particular access control apparatus 110, 120 enables a user 200 to locate the particular access control apparatus 110 within the controlled space 300. A schematic illustration of an access control system 100 installed within a controlled space 300 is shown in FIG. 2.

The controller 130, in certain instances, is configured to transmit the signal to the access control apparatuses 110, 120. When transmitting the signal from the controller 130 to the first access control apparatus 110, the controller 130 transmits the signal through the first wired connection 111. When transmitting the signal from the controller 130 to the second access control apparatus 120, the controller 130 transmits the signal through the second wired connection 121. The first wired connection 111 connecting the first access control apparatus 110 and the controller 130 may be preexisting wiring that was installed with the access control system 100. The second wired connection 121 connecting the second access control apparatus 120 and the controller 130 may be preexisting wiring that was installed with the access control system 100.

To have the controller 130 send the signal, either to the first access control apparatus 110 through the first wired connection 111 and/or the second access control apparatus 120 through the second wired connection 121, an instruction may be sent from an access control software application 140 to the controller 130. This access control software application 140 may, in certain instances, be accessible through a cloud-based platform 141. In certain instances, the access control software application 140 is accessible through a local computer system 142.

In certain instances, a handheld device 150 is provided to transmit the signal to at least one of the first access control apparatus 110 and/or the second access control apparatus 120. This handheld device 150, in certain instances, is capable of patching into at least one of the first wired connection 111 and the second wired connection 121 to transmit the signal. When transmitting the signal from a handheld device 150 to the first access control apparatus 110, the handheld device 150 transmits the signal through the first wired connection 111. When transmitting the signal from a handheld device 150 to the second access control apparatus 120, the handheld device 150 transmits the signal through a second wired connection 121. This handheld device 150 may be any device with a terminal block capable of patching into an existing wire.

To have only one of either the first access control apparatus 110 or the second access control apparatus 120 perform the response 112, 122, in certain instances, the signal is transmitted to only one of the first access control apparatus 110 or the second access control apparatus 120. Whichever apparatus, either the first access control apparatus 110 or the second access control apparatus 120, which receives the signal is the apparatus that performs the response 112, 122. In certain instances, a signal is transmitted to only one of the first access control apparatus 110 or the second access control apparatus 120 to aid a technician in differentiating between the existing wiring (ex. enabling a technician to determine which access control apparatus 110, 120 is connected to which wiring 111, 121).

To enable a user 200, which may or may not be a technician, to locate at least one of the first access control apparatus 110 and the second access control apparatus 120 within the controlled space 300, the response 112, 122, in certain instances, includes at least one of a emitting a sound and emitting a light. The light, in certain instances, includes at least one of a blinking and a color. The sound, in certain instances, includes at least one of a buzz and a beep. The response 112, 122 may, in certain instances, include a combination of responses (ex. both emitting a light and emitting a sound).

As shown in FIG. 2 a controlled space 300 may include a plurality of access control apparatuses 110, 120. Each access control apparatus 110, 120 being connected via wired connections 111, 121, respectively, to a controller 130. Depending on the distance between a particular controller 130 and the access control apparatuses 110, 120 connected to the controller, it may be difficult for a user 200 to determine where the access control apparatuses 110, 120 are within a given controlled space 300.

The method provided herein enables a user 200 to more easily locate at least one access control apparatus 110, 120 in the controlled space 300. The method eases the locating by instructing at least one access control apparatus 110, 120 to emit a response 112, 122. The method includes transmitting, through the wired connection 111, 121 between the controller 130 and at least one access control apparatus 110, 120, a signal including at least one access control apparatus instruction to at least one of a first access control apparatus 110 and a second access control apparatus 120. The method further includes performing at least one response 112, 122 by at least one of the first access control apparatus 110 and the second access control apparatus 120. The response 112, 122 includes at least one of emitting a sound and emitting a light. The signal may be transmitted either from the controller 130 or a handheld device configured to patch into the wired connection 111, 121. Regardless of how the signal is transmitted, the response 112, 122 performed by the respective access control apparatus 110, 120 enable a user 200 to more easily locate the access control apparatus performing the response 112, 122.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for enabling a user to locate an access control apparatus within a controlled space in a system comprising two or more access control apparatuses, the method comprising:

providing a controller, the controller being in wired communication with a first access control apparatus through a first wired connection and in wired communication with a second access control apparatus through a second wired connection;

transmitting, from the controller through the first wired connection, a signal comprising an access control apparatus instruction, the signal comprising a particular voltage, to the first access control apparatus;

indicating a location of the first access control apparatus within a controlled space by performing a response by the first access control apparatus, the response being caused by the access control apparatus instruction, wherein the response comprises at least one of: emitting a sound and emitting a light, wherein different voltages trigger different responses; and transmitting, with a handheld device capable of patching into one of the first wired connection and the second wired connection, the signal to one of the first access control apparatus and the second access control apparatus using one or more of the first wired connection and the second wired connection.

2. The method of claim 1, wherein at least one of the first access control apparatus and the second access control apparatus are an access control reader or a door controller.

3. The method of claim 1, wherein the controller receives an instruction from an access control software application to transmit the signal.

4. The method of claim 3, wherein the access control software application is accessible through at least one of a cloud-based platform and a local computer system.

5. An access control system for enabling a user to locate an access control apparatus, the system comprising:

a first access control apparatus;

a second access control apparatus;

a controller in wired communication with the first access control apparatus through the first wired connection and in wired communication with the second access control apparatus through the second wired connection, the controller configured to indicate a location of the first access control apparatus within a controlled space by transmitting a signal through the first wired connection, the signal comprising an access control apparatus instruction, and a particular voltage, the access control apparatus instruction causing the first access control apparatus to perform a response, the response comprising at least one of: emitting a sound and emitting a light, wherein different voltages trigger different responses; and a handheld device capable of patching into one of the first wired connection and the second wired connection, the handheld device configured to transmit the signal to one of the first access control apparatus and the second access control apparatus using one or more of the first wired connection and the second wired connection.

6. The access control system of claim 5, wherein the controller receives an instruction from an access control software application to transmit the signal.

7. The access control system of claim 6, wherein the access control software application is accessible through at least one of a cloud-based platform and a local computer system.

8. The access control system of claim 5, wherein the light comprises at least one of: a blinking and a color.

9. The access control system of claim 5, wherein the sound comprises at least one of: a buzz and a beep.

10. The access control system of claim 5, wherein at least one of the first access control apparatus and the second access control apparatus are an access control reader or a door controller.

* * * * *